(12) United States Patent
Lai et al.

(10) Patent No.: US 7,843,965 B2
(45) Date of Patent: Nov. 30, 2010

(54) DYNAMIC BANDWIDTH ALLOCATION METHOD WITH PUNISHMENT MECHANISM IN PASSIVE OPTICAL NETWORK

(75) Inventors: Zone-Chang Lai, Taichung (TW); Han-Chung Kuo, Sijhih (TW); Shang-Chun Chao, Hualien (TW); Chi-Chien Liu, Hsinchu (TW); Chih-Tang Chang, Jhudong Township, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 630 days.

(21) Appl. No.: 11/428,780

(22) Filed: Jul. 5, 2006

(65) Prior Publication Data

US 2007/0147834 A1 Jun. 28, 2007

(30) Foreign Application Priority Data

Dec. 28, 2005 (TW) .............................. 94146977 A

(51) Int. Cl.
*H04J 14/00* (2006.01)
(52) U.S. Cl. ....................................... 370/468; 709/233
(58) Field of Classification Search .................. None
See application file for complete search history.

(56) References Cited

U.S. PATENT DOCUMENTS

| | | | |
|---|---|---|---|
| 6,118,791 A * | 9/2000 | Fichou et al. ............... | 370/468 |
| 6,192,032 B1 * | 2/2001 | Izquierdo .................... | 370/230 |
| 6,816,494 B1 * | 11/2004 | Raza ...................... | 370/395.41 |
| 6,826,160 B1 | 11/2004 | Wang et al. | |
| 6,891,856 B2 | 5/2005 | Umayabashi | |
| 7,289,437 B2 * | 10/2007 | Chiruvolu ................... | 370/228 |
| 7,327,679 B2 * | 2/2008 | Naor et al. .................. | 370/232 |

OTHER PUBLICATIONS

Chadi M. Assi, "Dynamic Bandwidth Allocation for Quality-of-Service Over Ethernet PONs", IEEE Journal, Nov. 2003, pp. 1-11, vol. 21, No. 9.

* cited by examiner

*Primary Examiner*—Chirag G Shah
*Assistant Examiner*—Steve Young
(74) *Attorney, Agent, or Firm*—Workman Nydegger

(57) ABSTRACT

A dynamic bandwidth allocation method with a punishment mechanism applicable in an Ethernet passive optical network (EPON) is provided. The method utilizes GATE message, report message format, and different data types of a multi-point control protocol (MPCP) to order various queues to make the queues have priority and transmit them sequentially in transmission. Meanwhile, the method can fairly allocate the bandwidth and reduce the delay time of queue according to an appropriately designed punishment mechanism and bandwidth allocation principle, so as to fulfill the requirements of Quality of Service (QoS).

2 Claims, 5 Drawing Sheets

DYNAMIC BANDWIDTH ALLOCATION METHOD WITH PUNISHMENT MECHANISM IN PASSIVE OPTICAL NETWORK

CROSS-REFERENCE TO RELATED APPLICATIONS

This non-provisional application claims priority under 35 U.S.C. §119(a) on Patent Application No(s). 094146977 filed in Taiwan, R.O.C. on Dec. 28, 2005, the entire contents of which are hereby incorporated by reference.

BACKGROUND OF THE INVENTION

1. Field of Invention

The present invention relates to a dynamic bandwidth allocation method in passive optical network (PON), and more particularly, to a dynamic bandwidth allocation method with a punishment mechanism, wherein the time allocation of each path during each cycle period is variable.

2. Related Art

Recently, PON has been increasingly utilized in research and industry. PON mainly includes Ethernet PON (EPON) and broadband PON (BPON) used in asynchronous transfer mode (ATM) network and so on. The main architecture of EPON is shown in FIG. 1, mainly constituting an optical line terminal (OLT) 10, a 1×N optical splitter 12, multiple optical network units (ONU) 14, and optical fibers 16. The optical splitter 12 is mostly 1×16, 1×32, or 1×64, so the number of the ONU 14 is 16, 32, or 64 respectively. During the operation, data are transmitted from OLT 10 to ONU 14 by broadcasting, which is referred to as downloading; while data are uploaded from ONU 14 to OLT 10 by time division multiplexing (TDM). That is to say, when data are downloaded, every ONU 14 receives data and then selects and reads the related data. When data are uploaded, the OLT 10 sequentially orders specific ONUs 14 to upload data. At this time, the ordered ONUs 14 must upload data to the OLT 10 in a burst mode, which is referred to as the so-called operational mode of multipoint control protocol (MPCP) of PON.

During the PON operation, the data upload bandwidth allocation manner is mainly classified into two types: one is fixed bandwidth allocation, and the other is dynamic bandwidth allocation. The operational principle of fixed bandwidth allocation is that each ONU 14 has a fixed bandwidth, for example, 65% for upload, and 35% for download. The dynamic bandwidth allocation manner can be seen in the thesis "Dynamic Bandwidth Allocation for Quality-of-Service Over Ethernet PONs", by Chadi M. Assi, Yinghua Ye, Sudhir Dixit, and Mohamed A. Ali, Institute of Electrical and Electronics Engineers (IEEE) Journal on Selected Areas in Communications, Vol. 21, No. 9, November 2003, pp. 1467-1477, wherein dynamic bandwidth allocation can be carried out by formulas (a)-(c):

$$B_i^g = \begin{cases} R_i, & \text{if } R_i \leq B_i^{MIN} \\ B_i^{MIN} + B_i^{excess}, & \text{if } R_i > B_i^{MIN} \end{cases} \quad (a)$$

$$B_i^{MIN} = \frac{(T_{cycle} - N \times T) \times r}{8} \times w_i \quad (b)$$

$$B_i^{excess} = \frac{B_{Total}^{excess} \times R_i}{\sum_{k \in K} R_{k_j}} \quad (c)$$

Formula (a) is the basic bandwidth allocation method, wherein $R_i$ represents the required bandwidth of $ONU_i$, $B_i^{MIN}$ represents the minimum bandwidth of $ONU_i$, $B_i^{excess}$ represents excess bandwidth which is re-allocated to $ONU_i$, and $B_i^g$ is the bandwidth actually obtained by $ONU_i$. It can be seen from Formula (a) that, when the required bandwidth is smaller than the minimum bandwidth, $ONU_i$ can be allocated with the required bandwidth; otherwise, besides the minimum bandwidth, $ONU_i$ can also be allocated with the excess bandwidth. The minimum bandwidth is shown by Formula (b), wherein $T_{cycle}$ represents a cycle period, N represents the number of ONU, $T_g$ represents the switching time of ONU, r represents the transmission rate, and $w_i$ represents the minimum bandwidth weight of ONU (determined by the user agreement). The excess bandwidth is shown by Formula (c), wherein $B_{Total}^{excess}$ represents the total number of the excess bandwidth, $R_i$ represents the bandwidth required by $ONU_i$, and $K=\{R_i > B_i^{MIN}\}$.

Though Formulas (a) to (c) can effectively utilize the excess bandwidth, allocating excess bandwidth according to the proportion of the required bandwidth $R_i$ of the $ONU_i$ does not satisfy the principle of fairness. As a result, users feeing for a small amount of bandwidth may be allocated with a great deal of bandwidth upon request.

Furthermore, the thesis also proposes using flow forecast and allocating excess bandwidth beforehand to reduce the waiting time of data with high priority. It mainly constitutes bandwidth requirements of high, moderate, and low priorities. The flow forecast mechanism is applied to the high priority part, and operated by the defined allocation manner, so as to reduce the average transmission delay of data with high priority. However, this method may increase the average transmission delay of data with other priorities, and the flow forecast error may reduce the utilization rate of the bandwidth.

Moreover, U.S. Pat. No. 6,826,160 provides a dynamic bandwidth allocation method, wherein the current flow situation is obtained from the ONU and the bandwidth is dynamically generated by adding in other conditions. The method can dynamically allocate bandwidth, but it may cause unfairness in that users have extremely large flow to occupy too much bandwidth. Meanwhile, this method is not particularly applied to an EPON network.

Moreover, U.S. Pat. No. 6,891,856 mainly provides a method and system for solving the delay problem. However, the bandwidth of quality of service (QoS) cannot be definitely guaranteed.

In view of the above, conventional dynamic bandwidth allocation has the following two disputed points. One is unfairness, wherein if an ONU continues to ask for a great deal of bandwidth over a long time, the ONU may continue to occupy excess bandwidth, thus causing unfair bandwidth allocation. The other is the delay problem, wherein during the network transmission, if a few ONUs continue to ask for a great deal of bandwidth over a long time, though the foregoing method can reduce their delay time, which majority of the other ONUs are prolonged, so the total delay time of the whole EPON is increased.

SUMMARY OF THE INVENTION

It is a main object of the present invention to provide a dynamic bandwidth allocation method with punishment mechanism in PON, so as to effectively solve the problems of the prior art to achieve fair bandwidth allocation, low transmission delay and high throughput for the QoS data.

The present invention provides a dynamic bandwidth allocation method with punishment mechanism in PON, including an OLT, a 1×N passive optical splitter, and a plurality of ONUs. The dynamic bandwidth allocation method includes following steps: setting the bandwidth protocol of each ONU; deploying the allocation bandwidth, accumulated excess bandwidth, and punishment flag corresponding to each ONU respectively at the OLT; inquiring the required bandwidth of each ONU; determining the allocation bandwidth of each ONU; determining the accumulated excess bandwidth; determining the state of the punishment flag; and transmitting data according to the determined allocation bandwidth. After that, the process returns to the step of inquiring the required bandwidth of each ONU to repeat the data transmission.

In comparison with the prior art, the present invention can directly guarantee QoS for data transmission by the upload/download bandwidth allocation method and punishment mechanism, accompanied by the queue transmission manner from high to low priority, so as to regulate the transmission delay of QoS, maintain the fairness of bandwidth allocation, and make the system vendor sign an agreement according to the requirements of the ONUs.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given herein below for illustration only, and which thus is not limitative of the present invention, and wherein.

DETAILED DESCRIPTION OF THE INVENTION

Figure 1:
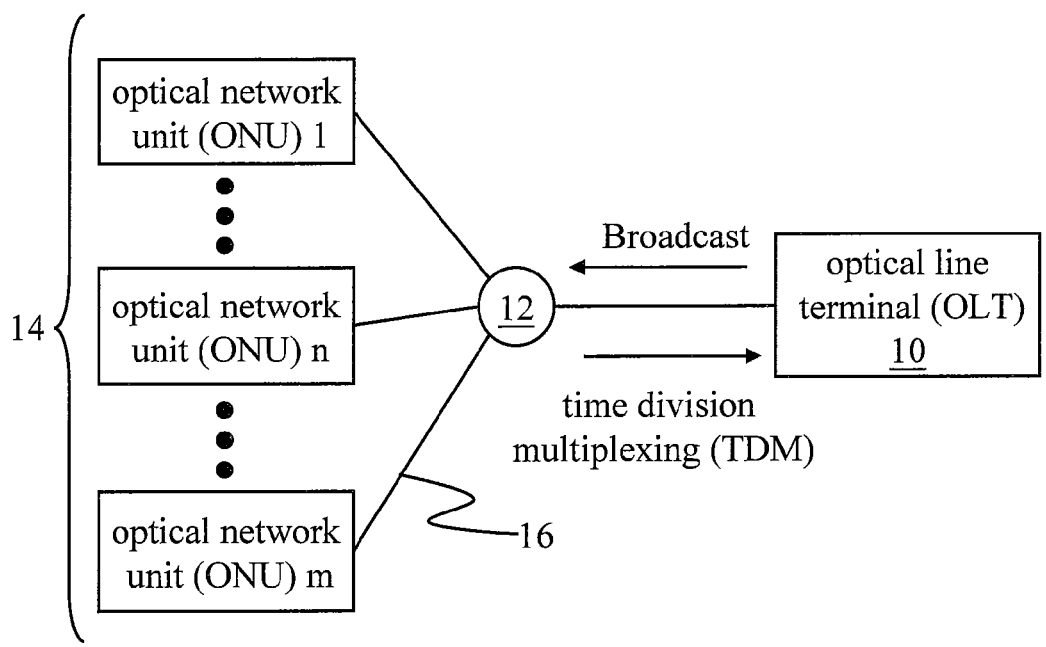
FIG. 1 is the schematic view of the architecture of the PON.
Figure 2:
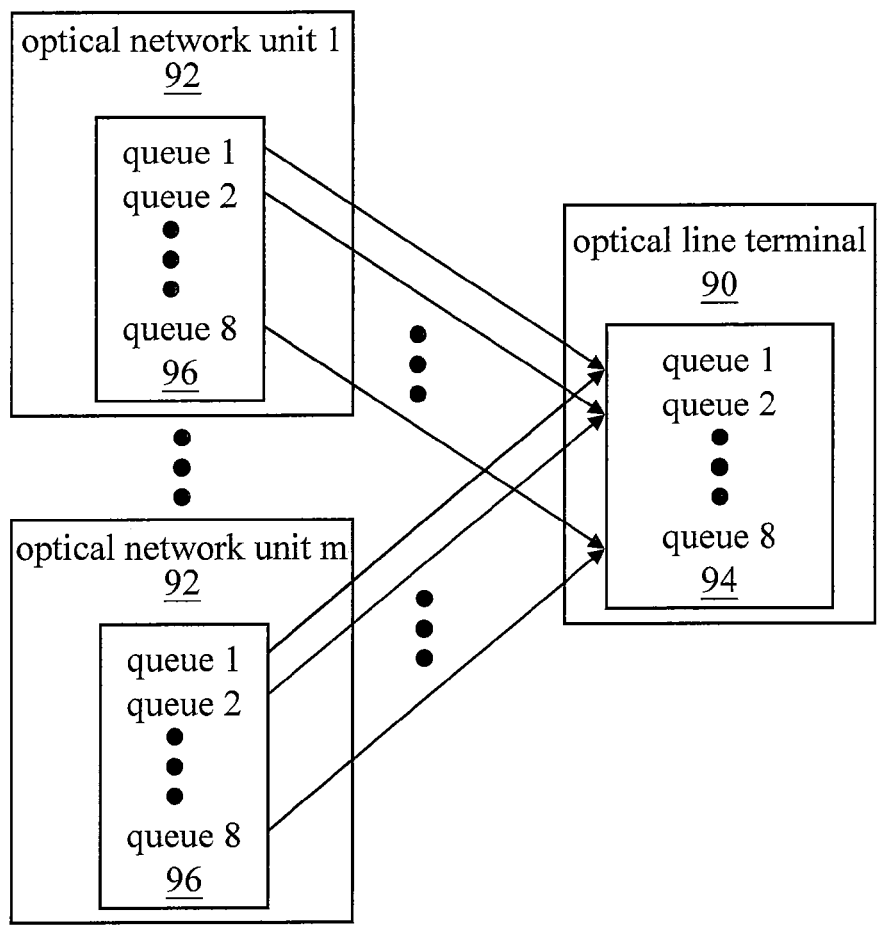
FIG. 2 is the schematic view of the architecture of the OLT and ONU with multiple queues according to the present invention.
Figure 3:
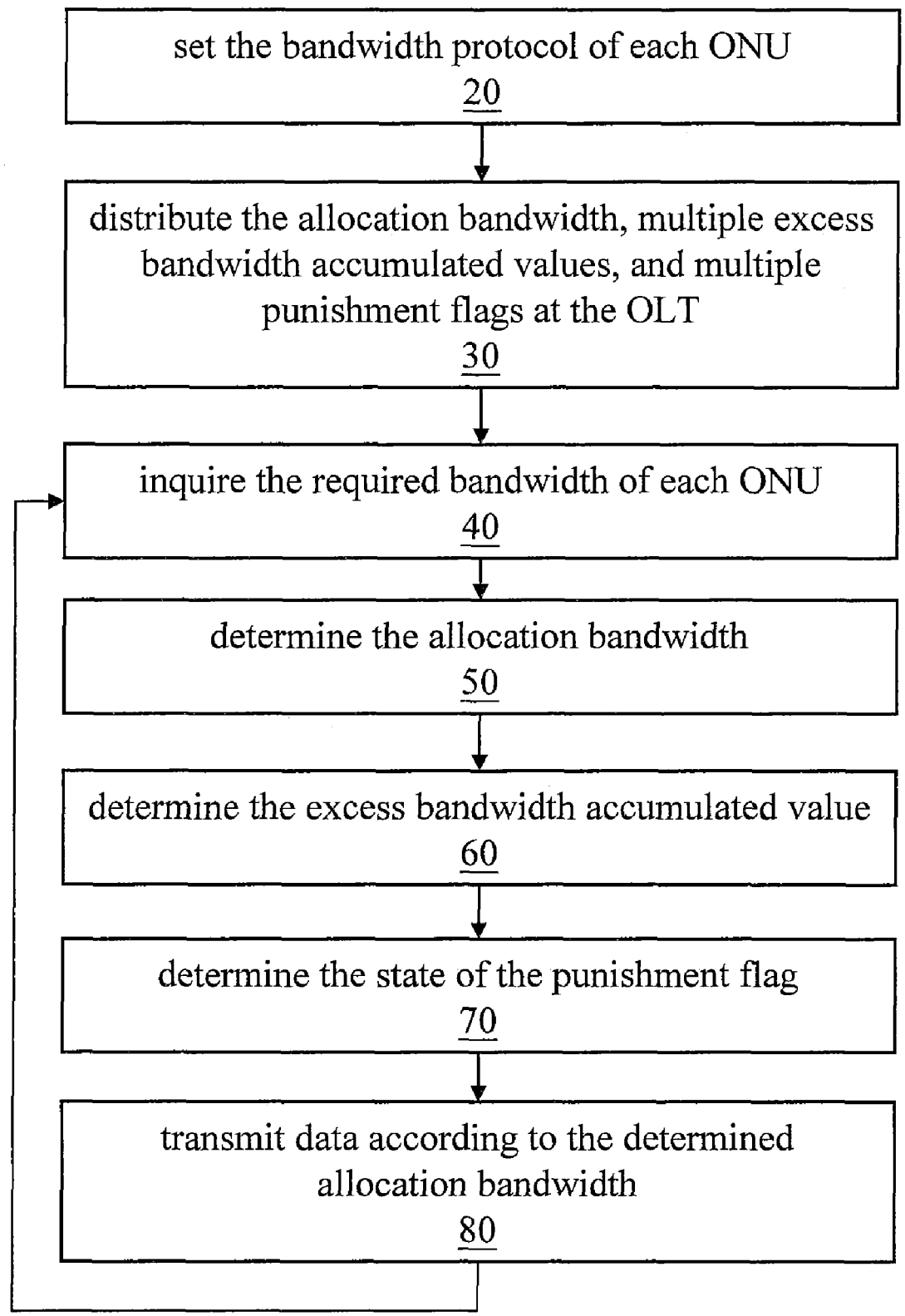
FIG. 3 is the flow chart of the embodiment of the dynamic bandwidth allocation method according to the present invention.

First, referring to FIG. 2, it is the architecture view of an OLT 90 and ONUs 92 with multiple queues according to the present invention. It can be seen from the drawing that, according to the present invention, the OLT 90 and the ONUs 92 are respectively provided with eight queues 94, 96. Dynamic bandwidth allocation is performed according to the priority and the uploaded data amount (bandwidth value) of each queue 96 at the ONUs 92, the downloaded data amount of each queue 94 at the OLT 90, and the punishment mechanism and bandwidth allocation principle of the present invention.

The dynamic bandwidth allocation of the present invention has two parts: data upload and data download. First, the bandwidth allocation method of data download is illustrated, which includes the following steps: (Step 1) summing all the downstream data amount of each queue 94 of the OLT 90, and calculating the required bandwidth; (Step 2) if the transmission period of the required bandwidth is larger than ½ cycle time, the download bandwidth is set for ½ cycle time; while if the transmission period of the required bandwidth is not larger than ½ cycle time, the download bandwidth is set to be the required bandwidth; and (Step 3) downloading data according to the download bandwidth.

It can be clearly seen from the above download bandwidth allocation method that: the transmission period of the download bandwidth cannot be larger than ½ cycle time for guaranteeing the upload bandwidth and the communication fluency. After the foregoing download bandwidth is allocated, the excess bandwidth (freeband) can be obtained by subtracting the download bandwidth from the overall bandwidth according to one cycle time. The larger the excess bandwidth is, the greater the upload data amount and the bandwidth for allocation will be.

Furthermore, the data upload method comprises scheduling various queues according to the GATE message, report message, and different data types of MPCP, thereby enabling each queue to have the basic information such as data type, priority message, and data amount for allocating bandwidth. As the definitions of MPCP, GATE/report message, and data classification belong to the general knowledge of the field, so they will not be described in detail herein.

The flow chart of the dynamic bandwidth allocation method of the present invention is shown in FIGS. 3 to 7, which includes the following steps:

Setting the bandwidth protocol of the ONUs 92 (Step 20); deploying the allocation bandwidth ($Allocate_i$), accumulated excess bandwidth (or called as accumulated value of excess bandwidth) ($A_i$), and punishment flag ($Lock_i$) to each ONU 92 respectively at the OLT 90 (Step 30); inquiring the required bandwidth ($Request_i$) of each ONU 92 (Step 40); determining the allocation bandwidth ($Allocate_i$) of each ONU 92 (Step 50); determining the accumulated excess bandwidth ($A_i$) (Step 60); determining the state of the punishment flag ($Lock_i$) (Step 70); and transmitting data according to the determined allocation bandwidth (Step 80), wherein after the step of transmitting data according to the determined allocation bandwidth, the process returns to the step of inquiring the required bandwidth of each ONU 92 to repeat data transmission.

The above-mentioned bandwidth protocol is the bandwidth requirements described in the agreement signed by the system provider and the ONUs. The protocol at least includes a minimum bandwidth ($B_i^{MIN}$), a maximum bandwidth ($B_i^{MAX}$), and an average bandwidth ($B_i^{AVG}$), wherein the minimum bandwidth is the lowest bandwidth required by the ONU. The aforementioned OLT further deploys with a upper bound of excess bandwidth ($A_i^{lock}$), a free excess bandwidth ($A_i^{free}$), and an accumulated excess bandwidth ($A_i$) respectively corresponding to each ONU. The punishment flag ($Lock_i$) has a punishment state ($Lock_i=1$) and a non-punishment state ($Lock_i=0$). The original state of the punishment flag is non-punishment, and the original value of $A_i$ is 0.

The present invention deploys the most suitable allocation bandwidth ($Allocate_i$) to each ONU 92 by utilizing the appropriate operations of the punishment flag ($Lock_i$), the required bandwidth ($Request_i$), and the accumulated excess bandwidth ($A_i$) etc., so as to achieve the fairness of dynamic bandwidth allocation, lowest delay, and QoS. The operation modes of Steps 50, 60, and 70 will be described as below.

Figure 4:
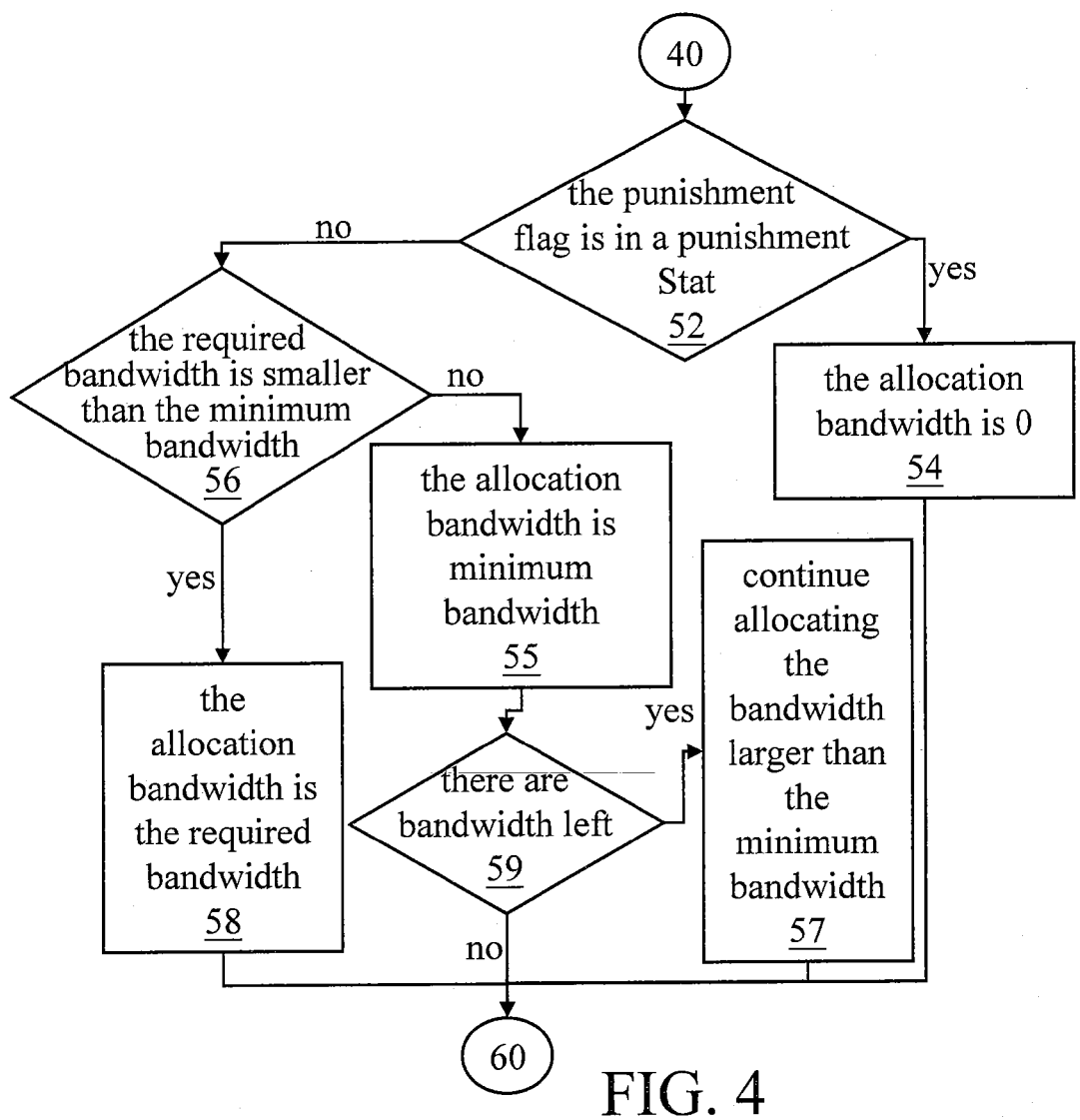
FIG. 4 is the flow chart of the embodiment for determining the allocation bandwidth of each ONU according to the present invention.

The method for determining the allocation bandwidth in Step 50 is shown in FIG. 4. When the punishment flag is in a punishment state ($Lock_i=1$), the allocation bandwidth is set as 0 ($Allocate_i=0$) (Steps 52, 54). When the punishment flag is in a non-punishment state and the required bandwidth is smaller than the minimum bandwidth ($Lock_i=0$ and $Request_i<B_i^{MIN}$), the allocation bandwidth is set to be the required bandwidth ($Allocate_i=Request_i$) (Steps 52, 56, 58). When the punishment flag is in a non-punishment state and the required bandwidth is greater than the minimum bandwidth ($Lock_i=0$ and $Request_i>B_i^{MIN}$), the allocation bandwidth is first set as the minimum bandwidth ($Allocate_i=B_i^{MIN}$). Until bandwidth has been deployed to all of the ONUs and while there is still bandwidth left, the part by which the required bandwidth is larger than the minimum bandwidth is allocated ($Allocate_i=Request_i$). Otherwise, if no bandwidth is left, the deployment is stopped (Steps 52, 56, 55, 57, 59). That is to say, the allocation bandwidth is first set as the minimum bandwidth, and the part by which the required bandwidth is larger than the minimum bandwidth is allocated after bandwidth has been deployed to the ONUs.

The purpose of Step 50 is to stop allocating bandwidth when the punishment flag of the ONU is in a punishment state. In Step 58, when the punishment flag is in a non-punishment state, if the bandwidth required by the ONU is smaller than the minimum bandwidth, the required bandwidth is directly allocated. After the bandwidth required by ONUs requiring bandwidth smaller than the minimum bandwidth is allocated, the bandwidth required by ONUs requiring bandwidth larger than the minimum bandwidth is then allocated, wherein the minimum bandwidth of each ONU is allocated first and then the excess bandwidth is calculated. If there is excess bandwidth, the part larger than the minimum bandwidth is allocated sequentially. Finally, the bandwidth is allocated to queues with QoS, and then allocated to Non-QoS queues, so as to support the QoS on data transmission.

There are two reasons for directly allocating the minimum bandwidth while the required bandwidth is smaller than the minimum bandwidth: one is that the minimum bandwidth is determined by the user agreement, therefore the right of use must be protected; the other is that during the bandwidth allocation by the OLT, assuming that the additional data may be sent to the ONU, the part by which the minimum bandwidth is larger than the required bandwidth can reduce the delay time for data transmission.

As the allocation is based on the order of the priority from high to low, when the required bandwidth of a queue is larger than the maximum bandwidth at the $ONU_i$, the algorithm may allocate accordingly to satisfy the requirement of the queue. However, the excessively allocated bandwidth is added into the accumulated excess bandwidth, and the next bandwidth allocation for the $ONU_i$ will be stopped. When the accumulated excess bandwidth ($A_i$) of the $ONU_i$ is larger than the upper bound of excess bandwidth ($A_i^{lock}$), the $ONU_i$ will not be deployed with bandwidth. That is to say, the above excess bandwidth is re-allocated to other ONUs. Until the accumulated excess bandwidth ($A_i$) of the $ONU_i$ is lower than the free excess bandwidth value ($A_i^{free}$), the bandwidth will be allocated to the $ONU_i$. The principle of allocating bandwidth according to priority can also be applied to the aforementioned downstream data.

Figure 5:
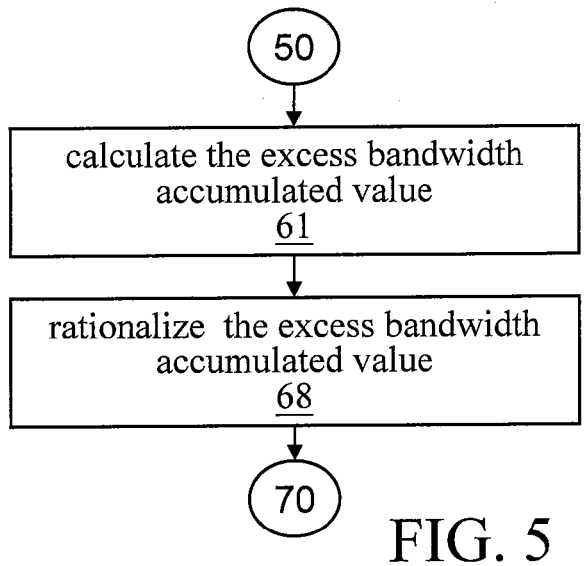
FIG. 5 is the flow chart of the embodiment for determining the accumulated excess bandwidth according to the present invention.
Figure 6:
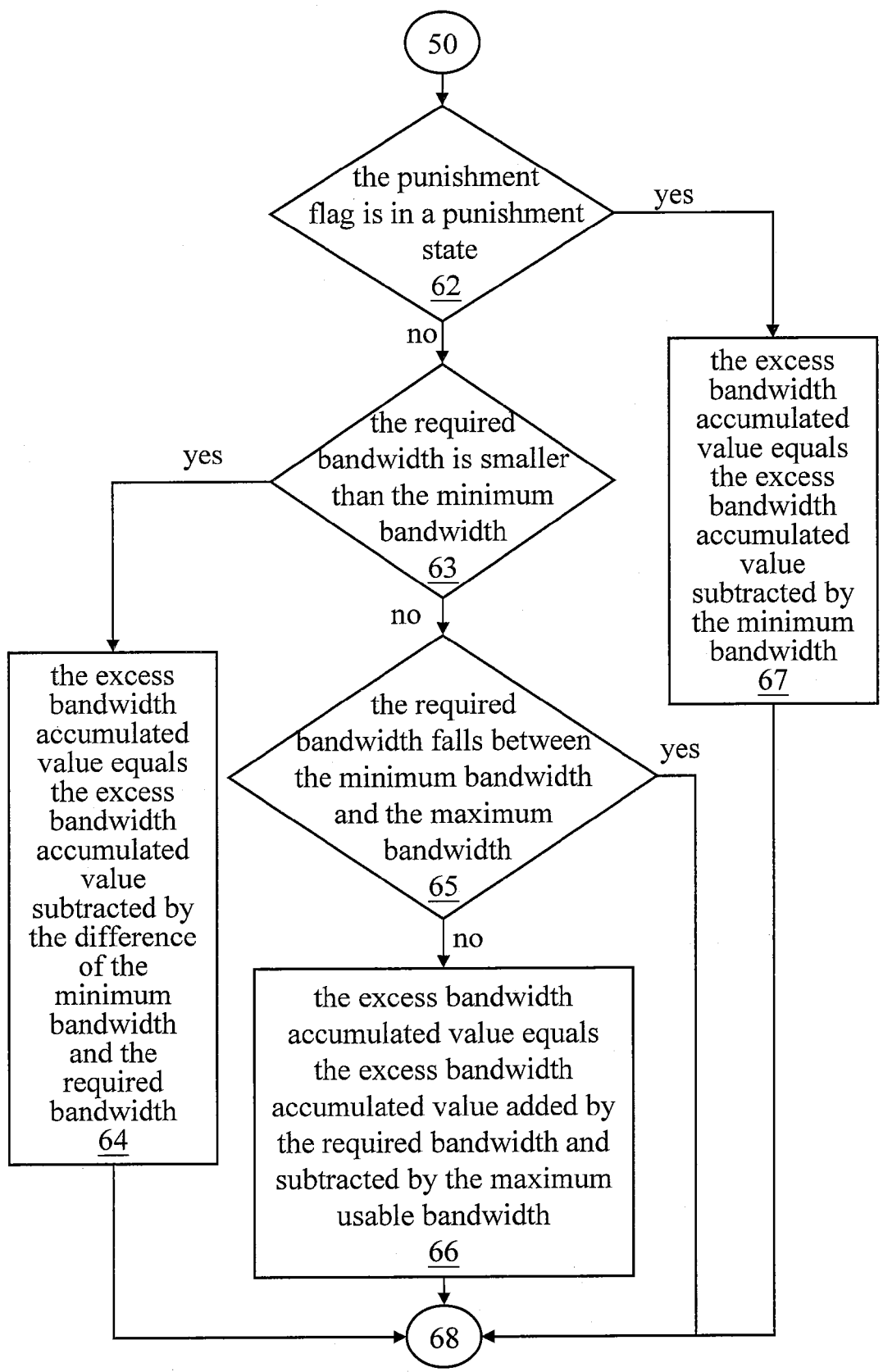
FIG. 6 is the flow chart of the embodiment for calculating the accumulated excess bandwidth according to the present invention.

The method for determining the accumulated excess bandwidth in Step 60 is shown in FIGS. 5 and 6. Step 60 includes: calculating the accumulated excess bandwidth (Step 61), and rationalizing the accumulated excess bandwidth (Step 68). Step 61 further includes the following steps.

If the punishment flag is in a punishment state ($Lock_i=1$), the accumulated excess bandwidth equals the accumulated excess bandwidth subtracted by the minimum bandwidth ($A_i=A_i-B_i^{MIN}$) (Steps 62, 67). If the punishment flag is in a non-punishment state and the required bandwidth is lower than the minimum bandwidth ($Lock_i=0$ and $Request_i<B_1^{MIN}$), the accumulated excess bandwidth equals the accumulated excess bandwidth subtracted by the difference of the minimum bandwidth and the required bandwidth ($A_i=A_i-(B_i^{MIN}-Request_i)$) (Steps 62, 63, 64). That is to say, if the punishment flag is in a non-punishment state and the required bandwidth falls between the minimum bandwidth and the maximum bandwidth ($Lock_i=0$ and $B_i^{MIN}<Request_i<B_i^{MAX}$), the accumulated excess bandwidth stays the same (Steps 62, 63, 65), i.e., $A_i=A_i$. If the punishment flag is in a non-punishment state and the required bandwidth is larger than the maximum bandwidth ($Lock_i=0$ and $Request_i>B_i^{MAX}$), the accumulated excess bandwidth equals the accumulated excess bandwidth added by the required bandwidth subtracted by the maximum bandwidth ($A_i=A_i+Request_i-B_i^{MAX}$) (Steps 62, 63, 65, 66).

The key point of the calculating method of $A_i$ is that when the required bandwidth of the ONUs 92 is larger than the maximum bandwidth, the difference is accumulated in $A_i$. Otherwise, if the required bandwidth is smaller than the minimum bandwidth, the unused bandwidth is subtracted. However, there are two circumstances: one is that when the ONU 92 is in a punishment state, the minimum bandwidth is subtracted (because the transmission of the ONU 92 is restricted in a punishment state). The other is that when the ONU 92 is in a non-punishment state, the difference of the minimum bandwidth and the required bandwidth is subtracted. As such, each ONU 92 and the bandwidth can be managed fairly and flexibly.

Of course, when the required bandwidth falls between the minimum bandwidth and the maximum bandwidth, $A_i$ will not be modified.

The foregoing method for rationalizing the accumulated excess bandwidth $A_i$ in Step 68 is when the accumulated excess bandwidth is smaller than 0 ($A_i<0$), the accumulated excess bandwidth is set as 0 ($A_i=0$), so as to avoid any unreasonable phenomenon. Meanwhile, even if the ONUs 92 require a bandwidth smaller than the minimum bandwidth, they still will be allocated the minimum bandwidth in the present invention.

Figure 7:
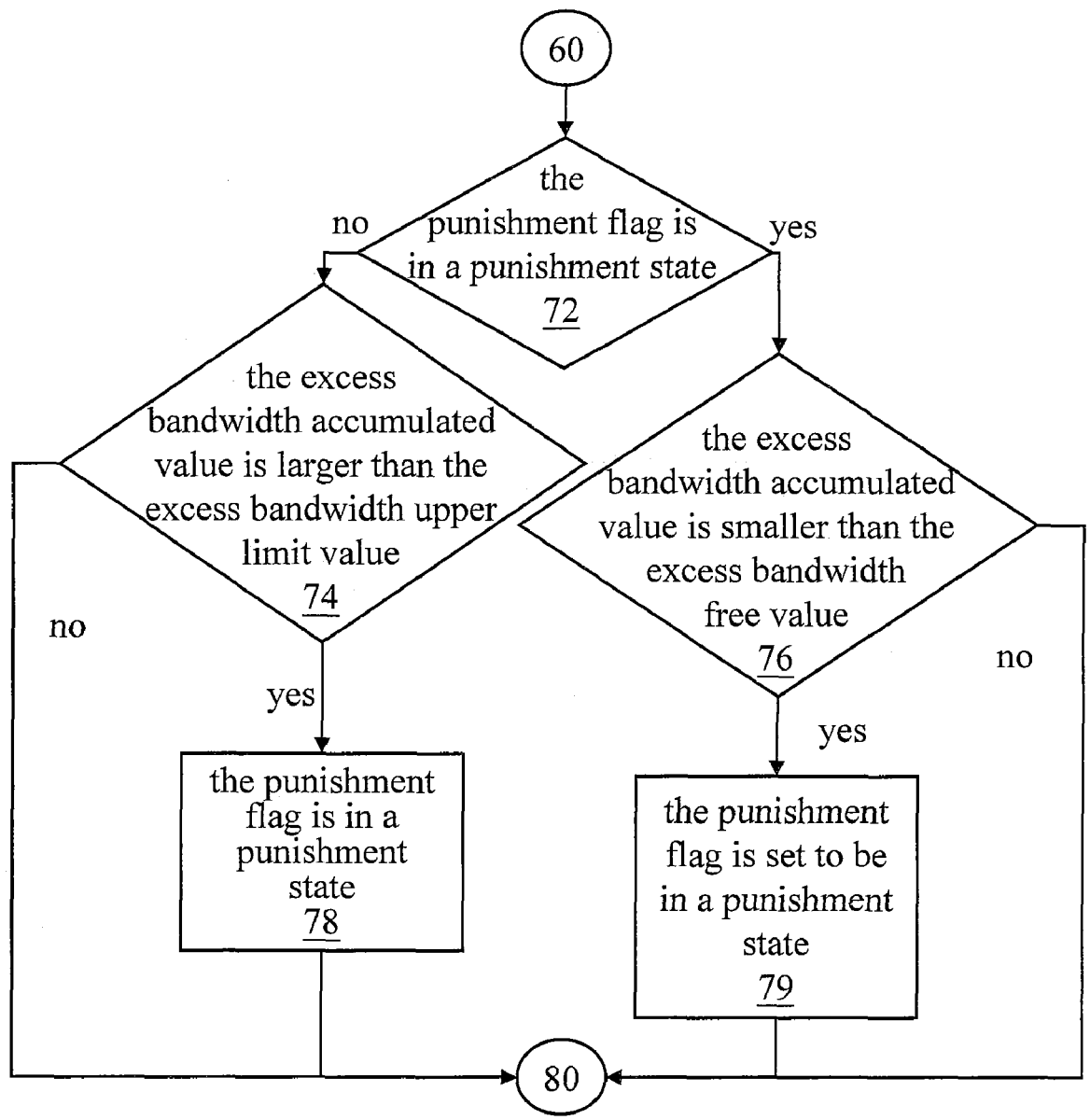
FIG. 7 is the flow chart of the embodiment for determining the state of the punishment flag according to the present invention.

Moreover, referring to FIG. 7, the method for determining the state of the punishment flag in Step 70 includes the following steps.

If the punishment flag is in a non-punishment state (i.e., $Lock_i=0$) and the accumulated excess bandwidth is larger than the upper bound of excess bandwidth ($A_i>A_i^{lock}$), the punishment flag is set to be in a punishment state ($Lock_i=1$) (Steps 72, 74, 78). If the punishment flag is in a punishment state (i.e., $Lock_i=1$) and the accumulated excess bandwidth is smaller than the free excess bandwidth ($A_i<A_i^{free}$), the punishment flag is set to be in a non-punishment state ($Lock_i=0$) (Steps 72, 76, 79). The punishment flag stays the same under other conditions.

Such a punishment mechanism is that when the ONU 92 requires a bandwidth larger than the maximum bandwidth, the difference is accumulated in $A_i$. When $A_i$ is larger than lock $A_i^{lock}$, i.e., the $Lock_i$ is set to be in a punishment state, the transmission of the ONU will be stopped in the next few transmissions. Only when $A_i$ is lower than the free excess bandwidth ($A_i<A_i^{free}$), the transmission of the ONU will be resumed. This behavior is event driven, that is, only when $A_i$ is added or subtracted is it examined whether or not the punishment mechanism should be implemented. The addition/subtraction of $A_i$ has been mentioned above, so it will not be described in detail again herein.

In view of the above, the present invention can directly guarantee QoS for data transmission by the upload/download bandwidth allocation method and punishment mechanism, accompanied by the queue transmission manner from high to low priority, so as to regulate the transmission delay of QoS, maintain the fairness of bandwidth allocation, and make the system vendor (OLT 90) sign an agreement according to the requirements of the ONUs 92. Therefore, it is practical, novel, and progressive.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A dynamic bandwidth allocation method with punishment mechanism in a passive optical network (PON) comprising an optical line terminal (OLT), a 1×N optical splitter, and multiple optical network units (ONUs), the dynamic bandwidth allocation method comprising:

setting a bandwidth protocol for each ONU, the bandwidth protocol comprising a minimum bandwidth, a maximum bandwidth which is greater than the minimum bandwidth such that a range exists between the minimum and maximum bandwidth, and an average bandwidth required by the ONU according to an agreement between the PON and ONU;

assigning an allocation bandwidth, a accumulated excess bandwidth, a free excess bandwidth, and a punishment flag to each ONU at the OLT, the accumulated excess bandwidth being defined as a predetermined amount of excess bandwidth which has been previously used by the ONU in previous data transmissions, each punishment flag having a punishment state and a non-punishment state with its original state being the non-punishment state, the free excess bandwidth corresponding to a lower limit of accumulated excess bandwidth which results in a punishment flag assigned to an ONU being changed from the punishment state to the non-punishment state, wherein the original value of each accumulated excess bandwidth is 0;

requesting an amount of required bandwidth of each ONU, wherein the required bandwidth is the overall bandwidth of eight queues in a multi-queue architecture;

allocating the allocation bandwidths using a method comprising:

changing the punishment flag to the non-punishment state if the accumulated excess bandwidth is smaller than the free excess bandwidth;

assigning an allocation bandwidth of 0 when the punishment flag is in the punishment state, such that bandwidth is not allocated to an ONU when the ONU is in the punishment state;

when the punishment flag is in the non-punishment state and the required bandwidth is smaller than the minimum bandwidth, setting the allocation bandwidth to the required bandwidth; and when the punishment flag is in the non-punishment state and the required bandwidth is larger than the minimum bandwidth, the allocation bandwidth is set to be the minimum bandwidth, and the part of the required bandwidth larger than the minimum bandwidth is allocated after bandwidth has been deployed to all of the ONUs;

calculating the accumulated excess bandwidths for each ONU using a method comprising:

if the punishment flag is in a punishment state, the accumulated excess bandwidth is subtracted by the minimum bandwidth;

if the punishment flag is in a non-punishment state and the required bandwidth is smaller than the minimum bandwidth, the accumulated excess bandwidth is subtracted by the difference of the minimum bandwidth and the required bandwidth;

if the punishment flag is in a non-punishment state and the required bandwidth falls between the minimum bandwidth and the maximum bandwidth, the accumulated excess bandwidth stays the same; and if the punishment flag is in a non-punishment state and the required bandwidth is larger than the maximum bandwidth, the accumulated excess bandwidth value is the accumulated excess bandwidth added with the required bandwidth and subtracted by the maximum bandwidth; and rationalizing the accumulated excess bandwidths such that the accumulated excess bandwidth is $\geqq 0$, by setting the accumulated excess bandwidth to 0 when the accumulated excess bandwidth is smaller than 0;

setting the punishment flag of an ONU to a punishment state when the accumulated excess bandwidth reaches an upper bound of accumulated excess bandwidth;

determining the states of the punishment flags; and transmitting data according to the determined allocation bandwidth, accumulated excess bandwidth, state of the punishment flag, and required bandwidth of each ONU, such that data from an ONU which has been assigned a punishment flag is not transmitted;

wherein, after the step of transmitting data, the method returns to the step of inquiring the required bandwidth of each ONU to repeat the data transmission.

2. The dynamic bandwidth allocation method with punishment mechanism in PON according to claim 1, wherein each of the queue has a priority value individually, and when data are transmitted according to each determined allocation of bandwidth, data with high priority are transmitted first while data with low priority are transmitted later.

* * * * *